United States Patent [19]

Jones

[11] Patent Number: 4,533,986
[45] Date of Patent: Aug. 6, 1985

[54] COMPACT ELECTRICAL POWER SUPPLY FOR SIGNAL PROCESSING APPLICATIONS

[75] Inventor: Dwight V. Jones, Baldwinsville, N.Y.

[73] Assignee: General Electric Company, Syracuse, N.Y.

[21] Appl. No.: 547,376

[22] Filed: Oct. 31, 1983

[51] Int. Cl.³ .......................................... H02M 3/335
[52] U.S. Cl. ...................................... 363/17; 363/56; 363/98; 323/222; 323/266
[58] Field of Search ............... 323/222, 223, 224, 266, 323/271, 289; 363/17, 80, 55-56, 98, 132

[56] References Cited

U.S. PATENT DOCUMENTS

| 3,596,165 | 7/1969 | Andrews | 363/19 |
| 3,745,444 | 7/1973 | Calkin et al. | 323/289 X |
| 4,143,414 | 3/1979 | Brewster et al. | 363/44 |
| 4,264,949 | 4/1981 | Simmons et al. | 363/17 |
| 4,323,595 | 4/1982 | Check | 363/40 |

FOREIGN PATENT DOCUMENTS 0186016  9/1966  U.S.S.R. ............................ 323/222

OTHER PUBLICATIONS

M. Mamon et al., "A Resonant Converter with PWM Control", Intelec. '81 Third International Telecommunications Energy Conference, London, England (May 19-21, 1981).
G. C. Johari, "Dissipation Reduction in Transistor Switching Regulator", IBM Technical Disclosure Bulletin, vol. 19, No. 5, Oct. 1976, pp. 1736-1737.
Mapham, N., General Electric Company, "An SCR Inverter with Good Regulation and Sine-Wave Output", *IEEE Transactions on Industry and General Applications Group* Annual Meeting, Chicago, IL., 10/3-6/1966, pp. 1-12.
Calkin and Hamilton, Bell Lab., "Circuit Techniques for Improving the Switching Loci of Transistor Switches in Switching Regulators", *IEEE Transactions on Industry and General Applications Group Mtg.*, Oct. 1972, pp. 477-484.
Rippel, RE, Jet Propulsion Lab., *Proceedings of Powercon6*, Sixth National Solid State Power Conversion Conference (Power Concepts, Inc.), Miami Beach, FL, May 2-4, 1979, pp. D1-1 to D1-20.
Amin, Dilip A., Hewlett Packard, "Applying Sinewave Power Switching Techniques to the Design of High Frequency Offline Converts", *Proceedings of Powercon7* (Power Concepts, Inc.,) Seventh National Power Conversion Converence, May, 1980, pp. A1-1-A1-7.
Myers and Peck, "200 kHz Power FET Technology in New Modular Power Supplies", *Hewlett-Packard Journal*, Aug. 1981, pp. 3-10.
Application Notes, International Rectifier, Power MOSFET Application Notes, AN-934, "The HEXFET's Integral Reverse Rectifier—A Hidden Bonus for the Circuit Designer".

Primary Examiner—Peter S. Wong
Attorney, Agent, or Firm—Richard V. Lang; Carl W. Baker

[57] ABSTRACT

The present invention relates to a compact electrical power supply which derives electrical energy from a low frequency medium voltage source (e.g. a 120 V 60 Hz ac main), and converts the electrical energy to a low voltage format suitable for solid state signal processing equipment. The supply entails in succession bridge rectification means, a dc-dc boost converter, a capacitor storage bank, and a half bridge converter, either resonantly or non-resonantly operated. The converters operate at frequencies substantially above audible frequencies in the interests of compactness. The design provides a high input power factor (inductive) with minimum EMT, and provides a lengthened voltage hold up after loss of power.

9 Claims, 4 Drawing Figures

COMPACT ELECTRICAL POWER SUPPLY FOR SIGNAL PROCESSING APPLICATIONS

BACKGROUND OF THE INVENTION

1. Field of the Invention

The present invention relates to electrical power supplies which derive electrical energy from a low frequency medium voltage source (e.g. a 120 V 60 Hz ac main), and which convert the electrical energy to another format suitable for the assigned load. More particularly, the invention relates to an improved converter for use in such supplies and to a combination of converters particularly adapted for providing low voltage electrical power to solid state signal processing equipment.

2. Description of the Prior Art

The primary function of an electrical "power supply" is to convert the electrical power in the available form to a form suited to a particular apparatus. The present power supply is designed for solid state electronic circuitry which requires a low supply voltage typically between 4 and 20 volts. The power levels of such supplies frequently lie between 50 and several hundred watts.

There has been a growing need for size and weight reduction in power supplies for solid state electronic circuitry. The continuing technological evolution has caused a continuous shrinkage in the size and weight of signal and data processing hardware, and the percentage of equipment cabinet volume and the percentage of equipment weight for the power supply function has continued to increase.

In addition to the need for reduced size and weight, a power supply for signal and data processing should have reasonable efficiency, high reliability and reasonable EMI (electromagnetic interference) performance.

Another feature of importance, particularly in supplies where significant amounts of power are drawn from the power line, is that the input power factor should be inductive, preferably greater than 0.8, and that the current drain should be continuous.

A final feature of critical importance to such supplies, is that the supply should have a substantial voltage "hold-up" after loss of input power. If this hold-up can be maintained for a reasonable period, periods of up to 50 milliseconds being useful for this purpose, the loss of signal information in processing or storage may be prevented.

A well-known approach to power supplies for semiconductor applications is to use a bridge rectifier to derive a dc voltage, followed by a capacitor bank to obtain an averaged dc output, followed by a converter, frequently of the half-bridge variety, to obtain an ac voltage. The latter ac voltage is then transformed by a transformer to a desired output voltage, which is then rectified and coupled to the load. Compactness and weight reductions in respect to conventional 60 hertz supplies have resulted from the use of converters operating in the 18 to 25 KHz region. The benefits of using higher frequencies to achieve greater compactness and additional weight reductions is accordingly acknowledged. However, in critical applications, the full complement of performance features must be dealt with.

The organization of the conventional converter is not generally satisfactory for such critical applications. In the conventional supply, rectification is followed by a capacitor energy storage bank, and the latter is followed by a converter. The presence of the capacitor storage bank for energy storage in such power supplies immediately following ac line rectifiers produces peak rectification and line current conduction in narrow pulses. Conduction in narrow pulses generates harmonics and thus distortion in the line current and a reduced power factor, all of which are objectionable. These objections have been avoided in the past by using a 12 pulse Δ-Y 60 hertz transformer connected ahead of the capacitor bank. Such a transformer occupies too much space for consideration under the foregoing constraints, and forces the adoption of a converter design in which there are no large 60 hertz inductive components.

SUMMARY OF THE INVENTION

Accordingly, it is an object of the present invention to provide an improved high frequency power supply for solid state electronic circuitry.

It is another object of the invention to provide a more compact, high frequency power supply for solid state electronic circuitry.

It is still another object of the invention to provide an improved power supply for solid state signal processing applications.

It is a further object of the invention to provide a power supply for solid state signal processing applications in which the output voltage is held up for a substantial period after the loss of power from the source.

It is another object of the invention to provide an improved high frequency power supply for solid state signal processing applications in which the input power factor is inductive, and in which the current is drawn continuously from the line.

These and other objects of the invention are achieved in a novel power supply, which following the input rectification means comprises in sequence a dc to dc boost converter, capacitive energy storage means, and a half bridge converter.

The dc to dc boost converter elevates the voltage available from a dc source while presenting an inductive load thereto. The boost converter comprises a first inductor connected to one input terminal of the boost converter, a first solid state switch serially connected via the principal electrodes thereof with the first inductor between the input terminals of the boost converter, conduction by the solid state switch causing current to flow in the first inductor and electrical energy to be stored in the inductor's field and a commutating diode serially connected with the inductor between the input and an output terminal of the boost converter. The commutating diode is poled to allow energy stored in said inductor to be transferred in the form of an induced current to the boost converter output when switch conduction is interrupted. The capacitive energy storage means at the boost converter output stores energy derived from the boost converter.

The half bridge converter, which obtains energy via its connection to the capacitive energy storage means, supplies energy to the load. The half bridge converter comprises a second and a third solid state switch serially connected across the capacitive energy storage means.

The half bridge converter further includes control means coupled to the control electrodes of the second and third solid state switches for causing alternate conduction, and an output transformer having a primary winding and a secondary winding. Alternating conduction of the second and third solid state switches alternately connect the primary winding to the common and non-common terminal of the capacitive energy storage means to produce an ac input to the primary winding of the transformer and cause energy to be supplied via the secondary winding and the output terminals to the load.

Further, in accordance with the invention, the boost circuit parameters are selected to produce continuous current flow in the first inductor under normal load conditions. In addition, the switching rate of the first solid state switch always exceeds the limits of audibility, and is substantially higher, consistent with tolerable switching losses in the first solid state switch and minimum size for the first inductor, while achieving a significant voltage boost for increased energy storage in the capacitive energy storage means.

Regulating means are provided in the boost converter responsive to the voltage stored in the capacitive energy storage means for adjusting the duty cycle of said first solid state switch to maintain the average stored voltage constant.

The bridge converter may take either a resonant or non-resonant form. In one resonant form, the bridge converter is series resonant and includes an inductive and a capacitive element, the primary of the output transformer being connected in series with the reactive elements. Regulating means are then provided for regulating an output parameter of the half bridge converter by adjusting the switching rate of the second and third solid state switches in relation to the resonant frequency of the series resonant elements.

In the non-resonant form, the half bridge converter is non-resonantly operated, the switching rates of the first, second and third solid state switches are synchronized. Regulating means, which are provided for regulating an output parameter of the half bridge converter, adjust the duty cycle of the second and third solid states switches rather than the frequency to maintain the output parameter constant.

In accordance with another aspect of the invention, an improved boost converter is provided which comprises, in addition, a second inductor connected in the series path between the first inductor and the commutating diode for storing energy during the turn on transient of the transistor switch to decrease the loss in said transistor switch. A second diode and a capacitor serially connected together are also provided in the improved boost converter. The serial combination of diode and capacitor are connected in shunt with the second inductor for reducing the rise in voltage across the solid state switch attributable to the inductor during the turn off transient of the transistor switch. The shunt functions by diverting a portion of the current transient to the capacitor. Finally, resistive means are provided connected in shunt with the capacitor for discharging the capacitor prior to the next such turn off transient.

Efficient converter power supplies, using existing components and fabricated in accordance with the inventive teaching, may be operated at switching rates continuing from audibility through 100 KHz.

BRIEF DESCRIPTION OF THE DRAWINGS

The novel and distinctive features of the invention are set forth in the claims appended to the present application. The invention itself, however, together with further objects and advantages thereof, may best be understood by reference to the following description and accompanying drawings, described below:

DESCRIPTION OF THE PREFERRED EMBODIMENTS

Figure 1:
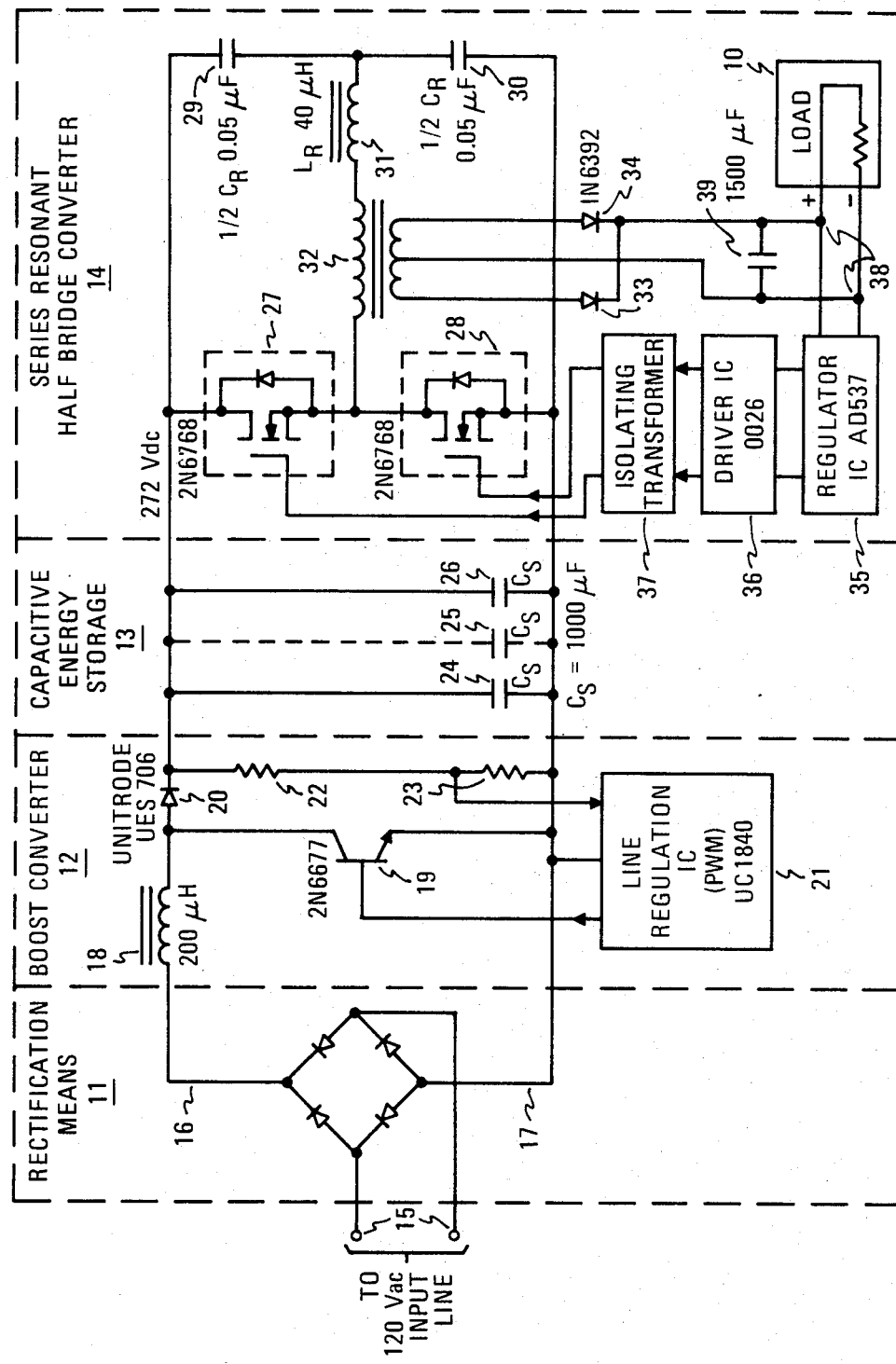
FIG. 1 is an illustration of a compact low voltage power supply designed particularly as a computer power supply. The illustration is a circuit diagram of the power supply in which the principal blocks of the power supply are shown in dotted lines enclosing the circuit elements and subordinate blocks. The principal blocks of the power supply include rectification means, a boost converter, capacitive energy storage means, and a series resonant, half bridge converter. Power is derived from the series resonant, half bridge converter in the FIG. 1 embodiment by a load serially connected with the resonant circuit of the converter.

Referring now to FIG. 1, a power supply in accordance with the invention is illustrated. The power supply derives its power from a connection to an ac supply, typically 120 volts at 50, 60 or 400 Hz (aircraft). The output of the illustrated power supply is at 5 volts dc with an upper current limit of 40 amperes, the supply having a conservative 200 watt power rating. As earlier noted, the power supply is designed particularly as a power supply for a computer or signal processing equipment having a volatile memory. In this application, it is essential that the actual volume of the power supply be small per watt of generated power, that the input power factor be inductive (current lagging) and that the power supply maintain a significant output voltage for up to 50 milliseconds after failure of the input power supply so that provision may be made to preserve the information stored in the computer to which power is being supplied. Typical design objectives are a packing density of 2 watts per cubic inch, and a power factor in excess of 0.8 (lagging). In addition, such supplies should ordinarily exhibit efficiencies of 70% or better, be of high reliability (typically $10^5$ hours MTBF (mean time between failure) and finally, satisfy conventional EMI requirements in relation to transients introduced into the power line.

The four principal blocks of the power supply illustrated in FIG. 1 bear the reference numerals 11, 12, 13 and 14. These blocks are respectively the rectification means 11, a boost converter 12, capacitive energy storage means 13 and a series resonant half bridge converter 14 from which power is derived.

The first block 11 is the rectification means which converts the ac input to a dc output. The rectification means illustrated is a bridge rectifier consisting of four rectifiers and having a pair of ac input terminals and a pair of dc output terminals. The ac input terminals of the bridge are connected to the input terminals 15 of a single phase low frequency ac supply. For supply requirements over 200 watts, a single phase input supply as shown may be connected to each phase of a 3 phase input power source, and the outputs of the three identical power supplies connected in parallel to a single load. The dc output terminals of the rectification means are respectively the positive terminal 16 and the negative terminal 17, the negative terminal 17 becoming the negative bus or "common" of the supply. The output voltage of the rectification means, with the illustrated bridge rectifier coupled to a 120 V 60 Hz main, is approximately 160 V dc.

The second block 12 is a "boost" converter having a dc input coupled to the output of the rectification means 11. The boost converter boosts the input voltage from a 160 V dc to a higher dc value (272 V dc) at its output. The "boost" converter in elevating the voltage, facilitates augmented energy storage in the capacitive energy storage means 13 which follows, increasing the duration of the voltage hold-up after failure of the ac main. The boost converter operates at a high frequency in relation to that of the ac input main, permitting the development of a higher voltage with a minimum sized inductance. The upper frequency limit is set by increasing switching losses in the semiconductors making up the boost converter. With available components, this frequency lies between 50 and 150 KHz.

The boost converter draws current substantially continuously through an inductor and thus has a desirable inductive component in the load appearing at the ac main.

The boost converter illustrated in FIG. 1 comprises an inductor 18 of 200 microhenries, a solid state switch 19 (a bipolar transistor as illustrated, type 2N6077 or a power MOSFET 2N6768); a commutating diode 20 (UES 706); a line regulation integrated circuit 21 (UC 1840); and a voltage divider comprising the resistances 22, 23. The inductor 18 has one terminal connected to the positive terminal 16 of the rectification means, and the other connected to the anode of the diode 20. The semiconductor switch 19 has its collector connected to the second terminal of the inductor and anode of diode 20, and its emitter connected to the power supply common (17). The control electrode of transistor 19 is connected to the control output of the line regulation IC 21. The IC 21 has its voltage sensing input connected to the tap on the voltage divider 22, 23. The voltage divider is connected between the cathode of the diode 20 and the common (17), between which the 272 V dc output voltage of the boost converter appears. The IC permits cyclical switching of the solid state switch within the desired range of 50-150 KHz, and typically operates within a 10-90% or 20-80% pulse width modulation duty cycle to regulate the output voltage of the boost converter.

The boost converter illustrated in FIG. 1 has a conventional circuit arrangement and functions in a conventional manner to produce a boosted dc output voltage. The solid state switch 19 when turned on, closes a current path through the inductor 18 between the dc output terminals 16 and 17 of the rectification means 11. This causes current to flow in the inductor 18 and the flow of current causes the storage of energy in the magnetic field of the inductor. During conduction of the solid state switch 19, the anode of the diode 20 is substantially at the common voltage and thus, if the cathode of the diode 20 is at a higher positive voltage, which is the normal operating condition, no current flows from the capacitive energy storage means 13 into the solid state switch 19. After a predetermined interval, the solid state switch 19 is turned off by an inhibiting control potential from the line regulation IC 21. When transistor 19 is turned off, the magnetic field surrounding the inductor 18 collapses and an EMF is generated exceeding that on the positive terminal of the rectification means 16, and normally exceeding that stored on the capacitive energy storage means 13, which has been falling due to current flow via the converter 14 to the load. Thus, the diode 20 becomes forward biased, conducts, and the energy stored in the inductor 18 is transferred in the form of a current via the diode 20 to the capacitive energy storage means 13 which forms the load coupled to the output of the boost converter.

The boost converter is designed to produce a step-up between the dc input and the dc output voltage. Depending on the conduction of solid state switch 19, energy is either being stored in the inductor 18 by conduction on the part of the solid state switch 19 or is being discharged from the inductor by conduction of the commutating diode 20 to charge the capacitive energy storage means 13. When operating normally, the current flows continuously from the rectification means 11 to the boost converter, in a repeating triangular waveform in which the minimum value never goes to zero. The inductor 18 is chosen to prevent the current from falling to zero when the diode Q1 is conducting even under minimum load conditions. When the output voltage of the boost converter tends to exceed the value set by the voltage divider and the voltage reference within the line regulation IC, the solid state switch 19 is made conductive for a relatively shorter conduction duty cycle, reducing the amount of energy stored in the inductor and available to charge the storage means 13 and causing the output voltage to fall. When the output voltage tends to fall below the value set by the line regulation network, the converse occurs, and the conduction duty cycle of the solid state switch 19 is increased.

As earlier noted, at lower switching frequencies, the losses in the semiconductors (19, 20), primarily attributable to stored charge, causing conduction after input junction turn off in the case of the solid state switch 19, or after the imposition of a reverse bias in the case of the diode 20, are small. As the operating frequency increases, however, these losses increase, and the dissipation in the devices must be taken into account.

The third block in the power supply is the capacitive energy storage means 13. The energy storage means is normally comprised of a bank of capacitors either in parallel or in a combination of series and parallel to achieve the desired energy storage capacity to sustain a load for the requisite number of milliseconds. In the practical example, a capacity of 3,000 microfarads is available made up of three paralleled aqueous electrolytics (24, 25 and 26). If a more reliable configuration is desired, preferred electrolytics are of the non-aqueous type whose maximum voltage is approximately 250 volts. In the event that these are used for voltages in excess of 250 volts, two devices are connected in series to achieve the desired voltage rating and paralleled to achieve the desired capacity.

The last block in the power supply is a series resonant converter 14 whose dc input is coupled to the capacitive energy storage means 13 and whose output is coupled to the load 10. In the practical example, the output operates at 5 volts dc with a current of up to 40 amperes.

The series resonant half bridge converter 14 comprises a pair of solid state switching devices 27, 28 forming the "half bridge"; a pair of resonating capacitors 29, 30; a resonating inductor 31; an output transformer 32 for reducing the output voltage to a value suitable for the load; and rectifiers 33, 34 for converting the transformer output voltage to dc. The converter 14, which uses MOSFET solid state switches (typically 2N6768s), is completed by two integrated circuits; a regulator IC 35 and a driver IC 36 and an isolating transformer 37. The last three elements complete a regulating network which controls the switching rate of the converter 14 to regulate output voltage or current.

The elements of the half bridge converter 14 are interconnected as follows: The solid state switches are serially connected across the output terminals of the capacitive energy storage means 13. The drain of the solid state switch 27 is connected to the positive terminal of the capacitive energy storage means. The source of the switch 27 is connected to the drain of switch 28 and the source of switch 28 is connected to the power supply common (17). The resonating capacitors 29 and 30, which are of equal value (0.05 microfarad), are also serially connected across the output terminals of 13, and in parallel with the switches 27, 28. The primary of the load transformer 32 and the resonating inductor 31 (of 40 microhenries) are serially connected between the interconnection of the switching devices 27, 28 and the interconnection of the capacitors 29, 30.

The configuration just described involving the four components 27, 28, 29 and 30 form a "half bridge" in that load current which flows between the interconnection between semiconductor switches 27, 28 and capacitors 29 and 30 is controlled by two active legs (and not by four). In the "half bridge" converter, the peak voltage across the load is approximately one-half the voltage of the dc supply. By contrast, the term "full bridge" denotes a configuration in which four semiconductor switches were available and in which four legs are active in switching current to the load. In the "full bridge", the peak voltage across the load is approximately equal to the full voltage of the dc supply.

The load transformer 32 has a 10 to 1 step down ratio and has a center tapped secondary. The outer terminals of the secondary are each coupled to the cathodes of a rectifier (33 or 34), whose cathodes are connected together to the positive power supply output terminal. The output is additionally filtered by capacitor 39 (1500 microfards) connected between the output terminals (38). The resistive load 10 is connected to the output terminals 38.

The regulating network comprises the elements 35, 36, 37 connected between the output terminals 38 and the gates of the solid state switches 27, 28. The regulator IC 35 has its inputs connected to the output terminals 38 and its output terminals connected to the IC driver 36. The IC regulator is designed to produce pulses having a 50% duty cycle at a frequency which is a function of the voltage applied across the input of the IC. If the voltage across the IC changes in respect to a reference internal to the IC, the square wave output frequency will increase (or decrease). The variable frequency output of the regulator IC 35 is coupled to the input of the driver IC 36. The driver IC is designed to produce adequate drive to operate the switches 27, 28. The driver 36 is provided with a suitable isolating transformer 37, typically having a one to one ratio. It is connected to the switches (27 or 28) in opposite senses to cause one switch to become conductive when the other becomes non-conductive.

The regulation of the supply illustrated in FIG. 1 is dependent on the relationship between the converter switching rate operating under the control of the load connected feedback loop and the natural resonant frequency set in part by the resonating inductor 31 and the resonating capacitors (29, 30). As seen from the illustration, the external load 10 is transferred by the transformer 32 to the primary where it appears in series with the resonating inductor 31 between the interconnection of the two semiconductor switches and the interconnection of the two resonating capacitors.

As will be seen, the resonating inductor 31 and resonating capacitors 29, 30 form a series resonant LC circuit. Assuming that switch 27 is momentarily conductive, current flows from the positive terminal of the capacitive energy storage means 13, through the switch 27, through the primary of the load transformer 32 into the left terminal of the resonating inductor 31 and out the righthand terminal, into the capacitors 29, 30, which are effectively in parallel. A moment later when switch 28 is conductive, the current path is reversed. Current is now allowed to flow back through the capacitors 39, 30, into the righthand terminal of the resonating inductor 31, out the lefthand terminal, through the primary of the load transformer 32 and through the switch 28 to the common. The load is effectively in series with the resonant circuit and the amount of power available for transfer to the load is a function of the relationship of the rate at which the converter 14 is switched and the natural resonance frequency of the series resonant circuit. The natural resonance frequency is made up predominantly by the capacity of the resonating capacitors and inductance of the resonating inductance, and in part by the stray capacitances of other elements in the circuit and the leakage inductance of the transformer 32. In the event that the switching rate is set at a rate which is higher than the natural resonance frequency of the converter, the output voltage will fall as the switching rate is increased further above resonance. Assuming that the load regulating IC 35 senses an output voltage below the desired value, it will be sensed to decrease the switching rate toward resonance to increase the voltage. The absolute voltage value that will be set is determined by the internal standard of the IC.

Figure 2:
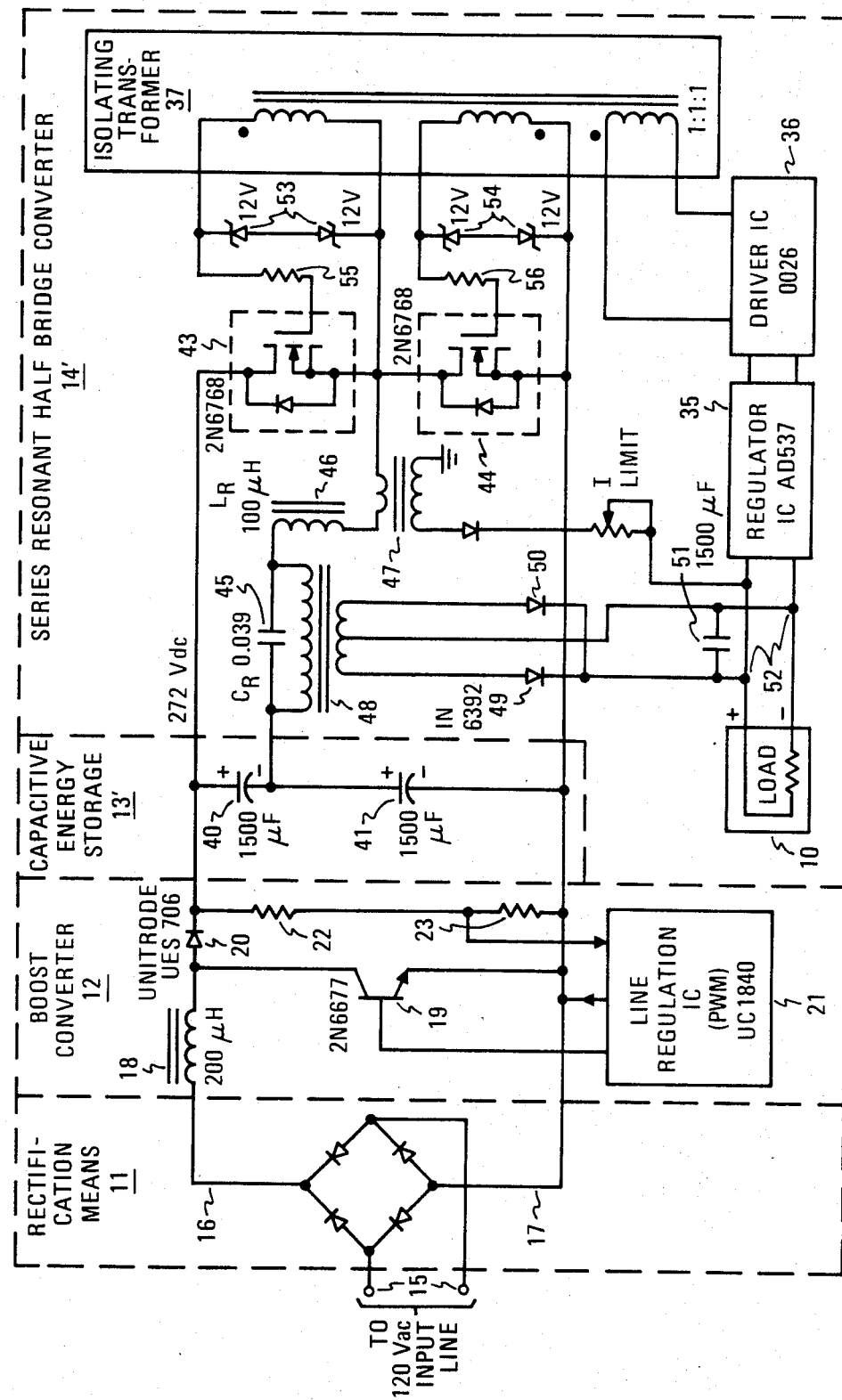
FIG. 2 is an illustration of a power supply also incorporating the four principal blocks shown in FIG. 1, but in which the load is connected in shunt with the resonant capacitor of the half bridge converter.

FIG. 2 is an illustration of a power supply also incorporating the four principal blocks shown in FIG. 1 and in which the fourth block is a series resonant half bridge converter 14' differing from that in FIG. 1 in that the load is connected in shunt with the resonant capacitor. Additionally, means are provided for limiting the output current in addition to stabilizing the output voltage. More particularly, the rectification means 11 and the boost converter 12 may be as shown in FIG. 1. The capacitive energy storage means 13' is seen to comprise two serially connected capacitors 40 and 41, serially connected between the common connection of the supply and the positive output terminal of the boost converter at +272 V dc.

The series resonant half bridge converter 14", which comprises the remaining elements in FIG. 2, is connected into the capacitive energy storage means at the interconnection 42 between the capacitor 40 and the capacitor 41. The converter 14', as in FIG. 1, includes a pair of solid state switches 43 and 44 serially connected via their principal electrodes between the positive output terminal of the boost converter and common (17). In particular, the drain of switch 43 is connected to the positive boost converter terminal, the source of switch 43 is connected to the drain of switch 44 and the source of switch 44 is connected to the power supply common (17). The resonating circuit and the load derivation means are interconnected between the common terminal 42 of the capacitors and the interconnection between the solid state switches 43, 44. The resonating circuit comprises the resonating capacitor 45 (of 0.039 microfarads) and the resonating inductor 46 (of 100 microhenries) serially connected between the terminal 42 of the capacitive energy storage means, and the interconnection of the solid state switches 43, 44. The power transformer 48, having a 23 to 1 step down ratio, is connected in shunt with the resonating capacitor 45. (The primary of the current transformer 47, also in series with the elements of the series resonant circuit (45, 46), is typically a single turn and contributes only a small inductive reactance to that circuit.) The transformer 48 has a center tapped secondary and, as in FIG. 1, two rectifiers 49 and 50 are provided poled to provide full wave rectification. A filter capacitor 41 is provided to filter the rectified output derived from the transformer secondary. The filtered output appears at the output terminals 52 and is coupled to an external load as shown at 10.

A feedback circuit for the resonant converter 14' controls both a maximum output current setting and regulates to a fixed output voltage. The load control circuit entails a regulator IC as shown at 35, similar to that shown in FIG. 1, a driver IC also similar to that shown in FIG. 1, and an isolating transformer 37 connected between the driver IC and the gate circuit of transistor switches 43, 44. The gate circuit is completed by the provision of two pairs of 12 volt back-to-back zeners, one pair (53) being connected across the control transformer secondary connected to switch 43 and the other pair (54) being connected across the transformer secondary connected to switch 44. A current slope limiting resistance of 47 ohms (55) is connected in series between the transformer secondary and the gate of switch 43 and a similar resistor (56) is connected in the path to the gate of switch 44.

The power supplies of FIGS. 1 and 2 may be compared as follows. Both have the same functional blocks, but the series resonant half bridge converter 14' of FIG. 2 (the last block) differs in that the load is in shunt with the resonant capacitor (45) rather than in series with the resonant inductor 31 and resonant capacitors 29, 30 of the half bridge converter 14 of FIG. 1. The output load in FIG. 2 may be viewed as powered from a voltage source (i.e. the voltage across 45) and the load in FIG. 1 may be viewed as powered from a current source, which is controlled by the operating frequency of the series resonant circuit.

There are advantages and disadvantages to both the series and shunt loaded converter circuits. One of the advantages of the series load circuit of FIG. 1 is the inherent current limiting. A disadvantage of that circuit is that at light loads or no load the magnetizing inductance of the output transformer becomes a significant part and thus lowers the resonant frequency which can complicate the control circuit operation under these conditions.

Often in a converter design, some capacitance is added across either the transformer (48) primary or secondary to "snub" and "dampen" the transients. This snubbing capacitance, if added across the transformer primary in FIG. 1, could affect the tuning depending on its contribution to the total resonant capacity. The introduction and choice of this capacitance can bring about a hybrid of the series and shunt loaded circuits. The resultant hybrid circuit can exhibit both the advantages and disadvantages of the FIG. 1 and 2 embodiments—in moderation, depending on the selection of the capacitance ratios that are in series and in shunt with the load. In an example of such a hybrid circuit, the transformer primary snubber/tuning capacitor may be 0.1 microfarads. This capacity is effectively in series with 0.2 $\mu$F [two 0.1 $\mu$F capacitors in parallel] across the output of 13, the energy storage means. By this selection, $\frac{1}{3}$ of the total tuning capacity is used to impart the attributes of the series load circuit.

A second difference in the FIG. 2 embodiment over that in FIG. 1 is that the energy storage electrolytic capacitors (40, 41) split the supply voltage in half, forming part of the $\frac{1}{2}$-bridge circuit, whereas in FIG. 1, a part of the resonant capacity (29, 30) splits the dc bus voltage and forms a part of the $\frac{1}{2}$-bridge.

In another version of the FIG. 1 circuit, the energy storage capacitors may be used to form part of the half bridge converter, while a single capacitor CR in series with LR is used to effect resonance.

Figure 3:
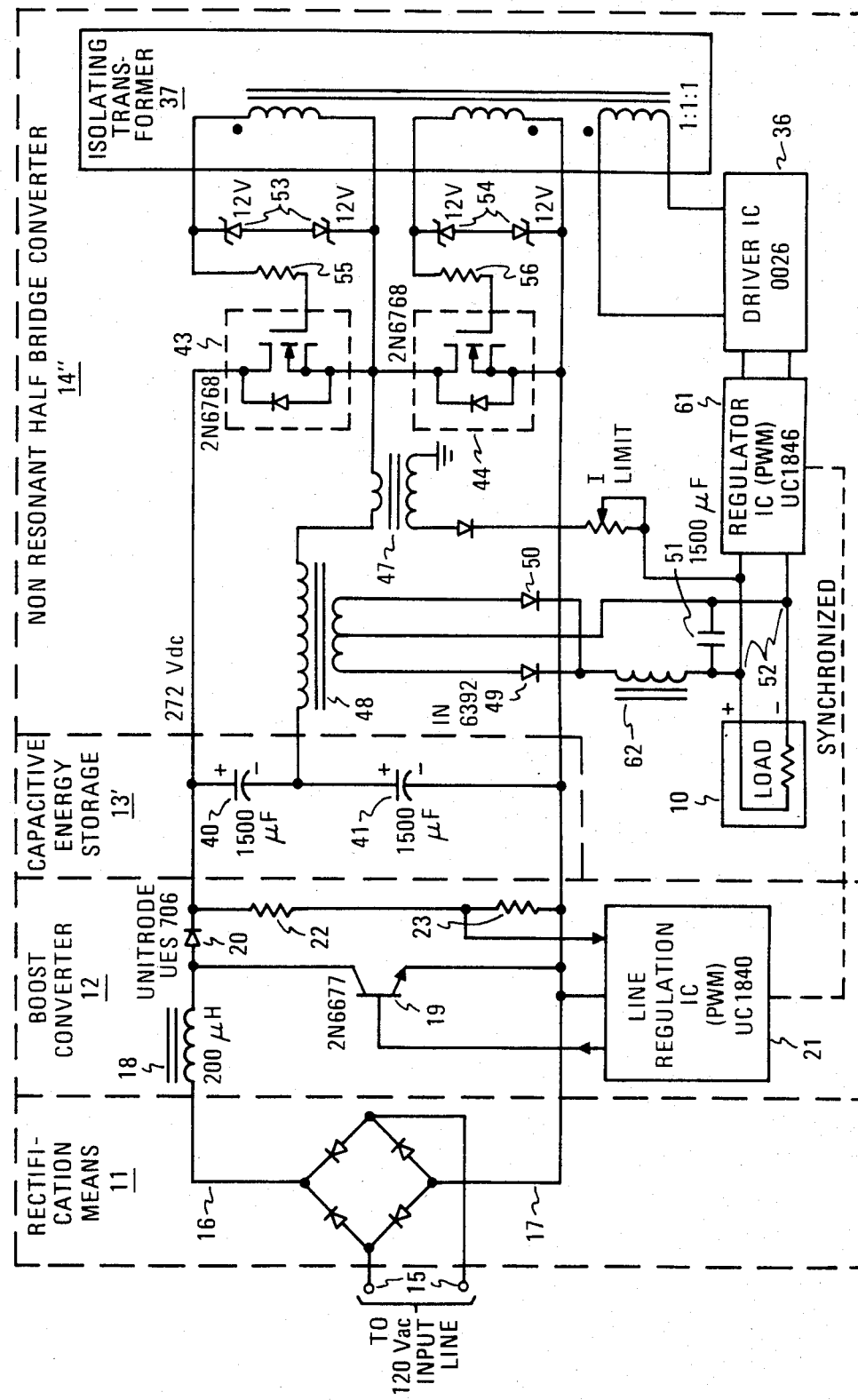
FIG. 3 is a further variation in which the fourth block of the power supply is a non-resonantly operated half bridge converter.

The invention may also be employed with a lower maximum switching rate using a non-resonant half bridge converter. The effect of the tuning in the FIG. 2 embodiment is to make the switching waveform more nearly sinusoidal, or richer in the fundamental at the switching rate. This reduces switching losses, and with a given set of switching transistors permits a somewhat higher switching frequency (100–150 KHz) before semiconductor losses become too large. In the FIG. 3 arrangement, using a non-resonant half bridge converter 14", the switching waveform is more nearly a square wave, and the maximum operating frequency (approximately 60 KHz) is accordingly smaller for the same semiconductor switches. The half bridge converter in FIG. 3 is not tuned, and the resonating impedances of FIG. 2 are eliminated. The output regulator should now take a form similar to that in the boost converter. In particular, one may use a regulator IC 61 (UC 1846) similar to the line regulation IC (UC1840) in the common use of a PWM type of control. The difference in drive requirements makes the push-pull IC (UC1846) preferable to the IC (UC1840) for the half bridge converter 14". PWM operation will produce additional ripple in the output waveform, so that the converter 14" also requires a filter inductor 62 to be inserted in the output path between the cathodes of rectifiers 49, 50 and the positive output terminal of the converter.

The major disadvantage of square wave non-resonant operation of the half bridge converter is the presence of higher frequency harmonics which cause losses in the core of the power transformer. This places the present practical limitation of about 60 KHz as the maximum operating frequency. This limitation is particularly due to a growth in the physical size of the transformer which occurs because of core and wire loss considerations at higher operating frequencies as well as due to the losses in the switching transistors at the fundamental of the operating frequency. The power losses associated with the higher frequency harmonics present in the square wave cause additional stresses on the semiconductor switches and their associated snubber networks.

The major advantage of square wave power conversion is its higher efficiency since the RMS current and peak current are lower for a square wave compared to a sine wave for a given power level. Higher Q in the resonant circuit will increase the efficiency of the power conversion, but it also increases both the active and passive component requirements due to the higher peak voltage and current. The component cost tradeoffs thus dictate the frequency limits discussed above. Advances in technology and changes in cost constraints will of course effect these limits.

Figure 4:
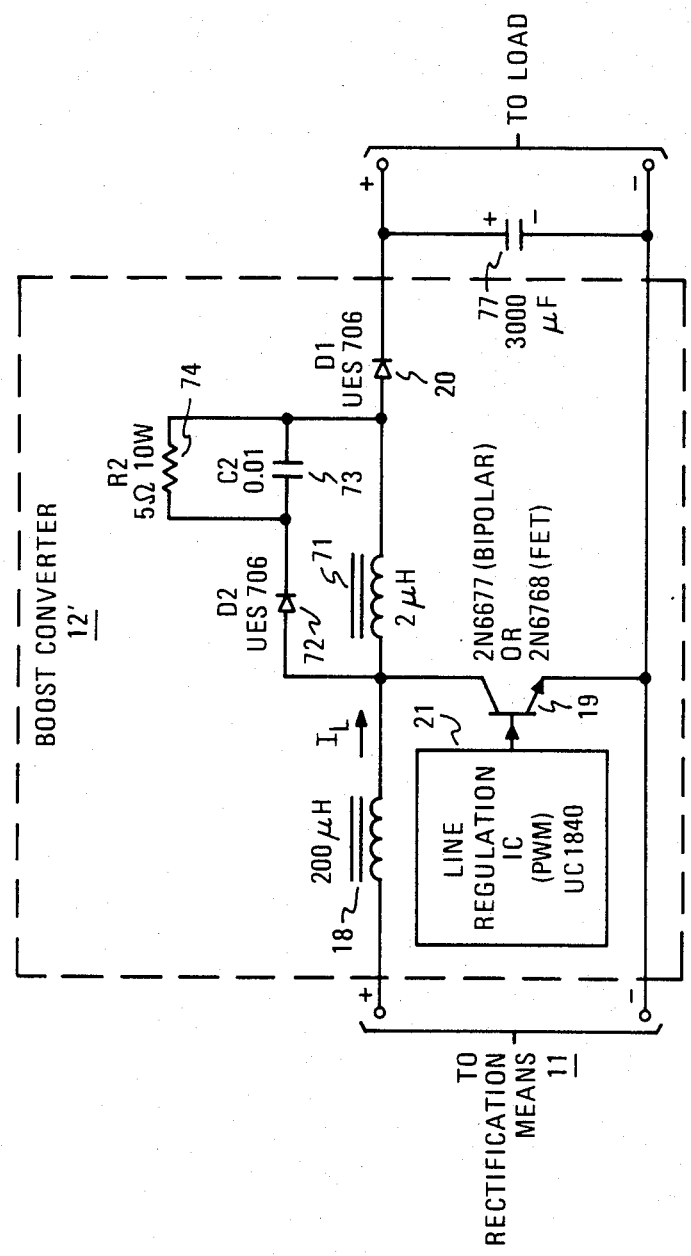
FIG. 4 is an illustration of a novel boost converter permitting higher frequency operation.

FIG. 4 shows an improved boost converter 12' suitable for use in any of the prior configurations where more reliable operation at a given high frequency or higher frequency operation with a given reliability is sought. The boost converter 12' employs an inductor 18, a semiconductor switch 19 and a diode 20 as before. It is also assumed that the rectification means 11 which supplies power to the boost converter and the capacitive energy storage means 13, which derives energy from the boost converter, are as before.

The new circuit components 71-74 added to the boost converter may be termed a "snubber", where their effect is to reduce dissipation in the transistor switch 19. The effect of the snubber upon the boost converter is that when introduced into a boost converter operating at 100 KHz, for example, the dissipation of the switching transistor 19 falls from 9 watts (without the snubber) to 4 watts (with a snubber) with the same load. The measured transistor case temperature in one example was 79° without a snubber and 60° with the snubber. While the total energy saving may not be great, since the energy is dissipated in resistive components of the snubber circuit, the reduced temperature at the switching transistor has the effect of reducing the stresses on the switching transistor and/or prolonging the life of the switch and/or permitting high output power.

Switching losses are a problem in boost converters where the inductor current is commutated between the commutating diode and the transistor switch. They are due in part to the recovery time of the commutating diode 20, and in part due to the recovery time of the transistor switch.

The booster converter is designed (by selection of the inductance and load) such that inductor current normally flows continuously, and flows either via the diode 20 to the capacitive energy storage means 13 for load energization or via the transistor switch 19 to the common 17 for energy storage in the converter. Dissipation occurs when transistor switch 19 is turned on and diode 20 continues to conduct after it is reverse biased. During this "recovery interval", before the commutating diode starts to block reverse voltage, there is a high peak current flow from the positive (272 V dc) terminal of the storage means 13 to the common 17. This stress must be withstood by the transistor switch 19 until the commutating diode 20 recovers and terminates conduction. Under these circumstances, the switch 19 has a high turn-on switching power loss due to the simultaneous occurrence of peak current conduction and high collector-emitter voltage. Had the commutating diode a faster recovery time, there would be a decrease in the duration of this "shoot through" interval and a decrease in the transistor turn-on power loss. A faster turn-on time for the transistor will cause stored charge in the diode to be swept out sooner (i.e. there will be a faster recovery) due to the increase of the di/dt. With present state of the art devices, bipolar switching losses during turn-on increase rapidly above about 80 KHz. The circuit of FIG. 4 raises the practical limit to about 100 KHz by inserting a small inductance 71 in series with the commutating diode 20. This inductance assumes a major part of the voltage at the 272 V dc bus until diode 20 has recovered from its forward conduction role. This reduces the voltage across the transistor switch at the beginning of its turn-on period, decreasing the switching loss. The inductor need only be a few microhenries (2-6 microhenries) since its function is to provide an impedance only during the switching transient.

The addition of the inductor 71 ordinarily causes an unacceptable overshoot in voltage at the collector of the transistor switch 19 when it is turned off, unless a snubber (72, 73, 74) is added across the inductor. The snubber consists of a diode 72 having its anode connected to the collector of transistor 19 (at a first terminal of inductor 71) and its cathode connected to one terminal of capacitor 73. The other terminal of capacitor 73 is connected to the anode of diode 20 (at the other terminal of inductor 71), thus connecting 72/73 series combination in shunt with the inductor 71. A resistor 74 is connected in shunt with the capacitor 73.

The turn-off of transistor switch 19 causes the current flowing from inductor 18 to enter the inductor 71 as diode 20 beings to turn on. The turn-on transient of current in inductor 71 normally elevates the collector voltage of transistor switch 19 at a time before current therein has terminated, stressing the transistor switch. The addition of the "snubber" circuitry (72, 73, 74) provides a low impedance path for inductor 18 current around inductor 71 during this transient and reduces the rise in collector voltage of transistor 19 by diverting a portion of the current transient to the capacitor 73. Resistor 74 provides a discharge path for capacitor 73.

The circuit illustrated in FIG. 4 is of advantage whether employed with a power MOSFET or a bipolar transistor. In general, the MOSFET outperforms the state of the art bipolar under these circumstances.

The circuits in FIGS. 1, 2 and 3 have been slightly simplified in the interests of clarity of presentation and generality. On occasion, additional gain, such as may be provided by an operational amplifier, may be required in the IC control networks depending on the drive requirements of the associated semiconductor switches, or the gain requirements of the feedback loops. One may, for instance, add gain between the output 52 of the converter and the input to the regulator IC.

The switching rates of the boost and half bridge converters in the power supplies herein described are selected by reconciling several important considerations. It is desirable that no audible sound be produced by the power supplies. Inductive components frequently generate sound at the operating frequency. This consideration sets the lower limit of operation as the upper limit of audibility, which is generally regarded as occurring near 16-18 KHz. A marked reduction in the size of magnetics is already present at these lower frequencies. Power supply designs operating in the near audible region (18-25 KHz) have been prevalent for many years. More recently designs using state of the art bipolar switching transistors have extended this range to 55 KHz. For more current designs a higher frequency is now optimum, the newer resonant designs tending to lie in the range of from 60 to 150 KHz. The reduction in size in the magnetics per se continues with increasing frequency, except for square wave converters (ie., FIG. 3), where above 60 KHz both copper and core losses and "pie"ing to minimize distributed capacity become more necessary. Upper limits, however, due to the inductor are less absolute, and are more often set by losses in available semiconductor switches and diodes. An additional upper limit is imposed by available dc output filter capacitors whose equivalent series inductance reduces the filtering effect above 100-300 KHz. The current designs, which entail state of the art semiconductor switches (i.e. bipolar transistors and power FETs) and diodes, set upper limits in the 60-150 KHz region, dependent on whether resonant or non-resonant operation is sought. Thus, the current resonant designs, for which operation between 60-150 KHz is the present optimum, may be expected in the future to operate between higher limits, particularly with advances in semiconductor design.

What is claimed as new and desired to be secured by Letters Patent of the United States is:

1. In a power supply, the combination comprising:
A. a dc source having a common and non-common output terminal;
B. a voltage regulated, series resonant half bridge converter having a pair of dc input terminal coupled respectively to said common and said non-common output terminal, and a pair of output terminals for connection to supply energy at a regulated voltage thereto, said half bridge converter comprising:
   (1) a first and a second solid state switch, each having a pair of principal electrodes and a control electrode, said first and second solid state switches being serially connected via the principal electrodes thereof between said terminals of said source,
   (2) an output transformer having a primary winding and a secondary winding, alternating conduction of said first and second solid state switches connecting one end of said primary winding alternatively to said common and said last recited non-common source terminal to produce an ac input to said primary winding and inducing an ac output in said secondary winding,
   (3) means coupled between said secondary winding and said output terminals for rectifying said transformer ac output and producing a dc output voltage at said converter output terminals,
   (4) series resonant circuitry including an inductive element and one capacitive element connecting in shunt and at least one capacitive element connected in series with said primary winding, and
   (5) regulating means responsive to said rectified dc output voltage, coupled to the control electrodes of said first and second solid state switches for causing alternate conduction thereof, controlled to achieve output voltage regulation by adjustment of the switching rates of said first and second switches in relation to the resonance frequency of said resonant circuitry.

2. In a power supply, the combination comprising:
A. a dc to dc boost converter for elevating the voltage of electrical energy supplied from a dc source while presenting an inductive load thereto, said elevation augmenting the energy stored in capacitive storage, said converter having a first pair of terminals for connection to said dc source, a second pair of terminals at which the boosted dc output voltage appears, the first terminals of said first and of said second pair being common, said boost converter comprising:
   (1) a first inductor connected to a second terminal of said first pair of terminals,
   (2) a first solid state switch having a pair of principal electrodes and a control electrode, said solid state switch being serially connected via the principal electrodes thereof with said first inductor between the first and second terminals of said first pair, conduction by said switch causing current to flow in said first inductor and electrical energy to be stored in the field of said first inductor,
   (3) a commutating diode serially connected with said inductor between the second terminals of said first and of said second pair of terminals, poled to allow energy stored in said inductor to be transferred in the form of an inductive current via said second pair of terminals when conduction of said switch is interrupted;
B. capacitive energy storage means for storing the current derived from said boost converter at said elevated voltage for said augmented energy storage, said capacitive means having at least two terminals, a first of which is coupled to said common terminal of said boost converter and a second of which is coupled to a second, non-common output terminal of said boost converter;
C. a voltage regulating half bridge converter having a pair of dc input terminals coupled respectively to the common and a non-common terminal of said capacitive energy storage means for deriving current therefrom and a pair of output terminals for supplying said derived current at a regulated voltage to said load, comprising:
   (1) a second and a third solid state switch, each having a pair of principal electrodes and a control electrode, said second and third solid state switches being serially connected via the principal electrodes thereof between said common and said last recited non-common terminal of said capacitive energy storage means,
   (2) an output transformer having a primary winding and a secondary winding, alternating conduction of said second and third solid state switches connecting one end of said primary winding alternately to said common and to said last recited non-common terminal to produce an ac input in said primary winding and inducing an ac output in said secondary winding,
   (3) means coupled between said secondary winding and said output terminals for rectifying said transformer ac output and providing a dc voltage at said load output terminals, and
   (4) first regulating means, responsive to said rectified dc output voltage, coupled to the control electrodes of said second and third solid state switches for alternate conduction, said regulating means, when input power is applied, effecting a controlled modulation of the energy transferred to said load via said alternate conducting switches for regulating the dc output voltage, and when a loss of input power occurs, said modulation is increased in a direction to extract increased energy in a given time as the voltage on said energy storage means falls and said augmented stored energy is consumed, to sustain said output voltage at the regulated value for a useful period after said loss of power.

3. The combination set forth in claim 2 wherein said half bridge converter is series resonant and includes an inductive and at least one capacitive element, the primary of said output transformer being connected in circuit with said resonant circuitry, and wherein said first regulating means adjusts the switching rates of said second and third solid state switches in relation to the resonance frequency of said resonant circuitry to effect said controlled modulation for voltage regulation.

4. The combination set forth in claim 3 wherein the primary of said output transformer is connected in shunt with said resonant capacitive element.

5. The combination set forth in claim 3 wherein the primary of said output transformer is connected in series with said resonant capacitive element.

6. The combination set forth in claim 2 wherein said bridge converter is series resonant and includes an inductive element and one capacitive element connected in shunt and at least one capacitive element connected in series with the primary of said output transformer, said first regulating means adjusts the switching rates of said second and third switches in relation to the resonance frequency of said resonant circuitry to effect said controlled modulation for voltage regulation.

7. The combination set forth in claim 2 wherein said half bridge converter is non-resonantly operated, the switching rates of said first, second and third solid state switches being syncronized with said regulating means and wherein said first regulating means adjusts the duty of said second and third solid state switches to effect said controlled modulation for voltage regulation.

8. The combination set forth in claim 2 wherein the boost circuit parameters are selected to produce continuous current flow in said first inductor under normal load conditions, the switching rate of said first solid state switch is made high, consistent with tolerable switching losses in said first solid state switch and minimum size for said first inductor, while achieving a significant voltage boost for increased energy storage in said capacitive energy storage means, and wherein second regulating means are provided, responsive to the voltage stored in said capacitive energy storage means for adjusting the duty cycle of said first solid state switch to maintain the average stored voltage constant.

9. The combination set forth in claim 2 wherein said boost converter comprises, in addition, a second inductor connected in the series path between said first inductor and said commutating diode for storing energy during the turn on transient of said transistor switch to decrease the loss in said transistor switch, a second diode and a capacitor serially connected together, the serial combination being connected in shunt with said second inductor for reducing the rise in voltage across said solid state switch atributable to said inductor during the turn off transient of said transistor switch by diverting a portion of the current transient to said capacitor; and resistive means in shunt with said capacitor for discharging said capacitor prior to the next such turn off transient.

* * * * *